United States Patent Office 2,721,140
Patented Oct. 18, 1955

2,721,140

PAPER OF HIGH WET STRENGTH AND PROCESS THEREFOR

Cyrus A. Weisgerber, Chadds Ford, Pa., assignor to Hercules Powder Company, Wilmington, Del., a corporation of Delaware No Drawing. Application September 19, 1952, Serial No. 310,565

6 Claims. (Cl. 92—3)

This invention relates in general to a resin-treated cellulosic fibrous product and a process for preparing the same, and in particular to a felted fibrous cellulosic material such as paper, paperboard, etc., characterized by improved wet strength and a process for preparing the same.

The present widespread demand for paper having high wet strength, particularly from the tremendously increased requirements of the food packing industry, has highlighted the importance of resins imparting a high degree of wet strength to paper. At the present time, one of the types of wet-strength resins most widely used in industry is urea-formaldehyde or modified urea-formaldehyde resins. Melamine-formaldehyde resins constitute a related type of wet-strength resin. These resins suffer from a number of disadvantages. Thus, melamine-formaldehyde and urea-formaldehyde wet-strength resins require that the paper slurry to which they are added have a low pH, preferably a pH of 4.5 and certainly no higher than about 5.5. Paper made in acid systems has a lower dry tensile strength and is more brittle than is paper made under neutral or alkaline conditions. Thus, the necessity for an acid medium to effect the polymerization of the urea-formaldehyde and melamine-formaldehyde resins constitutes a serious defect in the effective utilization of these resins. In addition, relatively large amounts of these resins are needed to impart high wet strength to the paper, 2% of the resin generally being recommended. Furthermore, these resins must be cured either by heat treatment or by curing for a time at room temperature in order to develop maximum wet strength.

Now in accordance with the present invention there is prepared a felted cellulosic product having significantly increased wet strength through the treatment thereof with polyvinylamine. The process of the instant invention is generally applicable to the production of all felted cellulosic products such as paper, board, shaped paper articles, etc., to produce new, improved products of significantly improved wet strength. Hereinafter the invention will generally be discussed in terms of the use of the process of the instant invention to produce a new paper of improved wet strength. It is understood, however, that the process is generally applicable to the production of new felted cellulosic products of improved wet strength.

The polyvinylamine may be added to the paper in the pulp form, for example, to paper pulp slurries, or may be applied to a preformed paper web. Thus, where the resin is applied to a preformed web, tub application methods may be used if desired. Thus, for example, preformed and completely or partially dried paper prepared from a chemical pulp such as sulfite, neutral sulfite, rags, soda or sulfate or a mechanical pulp such as ground wood or any mixture thereof may be immersed in a solution of the resin and impregnated therewith. The paper is then dried to give a paper of greatly increased wet strength. If desired, the paper may be heated for about 1 to 4 minutes at temperatures of about 100°–150° C. or higher or for shorter times at higher temperatures, whereby the resin is cured to a slightly more water-insoluble condition. This curing step is not necessary with the resins of the instant invention but may be used if desired. Any other method whereby the resin is applied to a preformed web, such as spraying, may also be used.

Alternatively, the resin may be added to an aqueous suspension of the paper stock, such as any of those enumerated above, in the beater, stock chest, Jordan engine, fan pump, head box or at any other suitable point ahead of the papermaking wire or screen followed by forming the treated fibers into a felted product on the wire or cylinder. The felted product is then dried in the usual manner to give a paper or board characterized by exceptionally high wet strength. If desired, the product may be given a heat treatment as described above to cure the resin. However, the heat treatment is not necessary to obtain a product characterized by exceptionally high wet strength.

In addition to pure polyvinylamine there may also be used the various impure polyvinylamines produced by Hanford and Stevenson in U. S. 2,365,340 and designated by them as polymeric solvolytic products of N-vinylimides of organic dicarboxylic acids when such impure products have at least 60% of their nitrogen present as primary amino groups as indicated by the Van Slyke test. The efficiency of the resins as wet-strength resins is directly proportional to the primary amino content of the resin. For this reason it is preferred that the resin have as high a primary amino content as possible.

However the resin is added, the pH of the resin-cellulosic fiber system may vary from about 5 to about 10 with a pH of about 6 to about 8 being preferred. Thus, the resin may be added to the paper furnish or web without significant departure from standard papermaking operations and procedures. Whichever process is used, there results a felted cellulosic product containing from about 0.1% to about 15% based on the weight of the fibers of a polyvinylamine, which product is characterized by having an increased tensile strength both in the wet and dry condition.

The use of an alkaline or approximately neutral pH in the papermaking system renders the resulting paper less brittle and gives it a higher dry tensile strength than would similar paper made under highly acid conditions. Furthermore, paper prepared with polyvinylamine develops a maximum wet strength at a relatively low amount of resin, i. e., with about 1% or less resin. Furthermore, no curing step is needed for the development of a greatly increased wet strength in the cellulosic product treated with polyvinylamine.

The general nature and form of the invention having been set forth and described the following examples are presented in illustration but not in limitation of the invention. All parts and percentages are by weight unless otherwise specified.

The wet tensile strengths in the following examples were determined by soaking one-inch samples of the paper in distilled water for 24 hours and then running the test on a Scott IP-4 tensile tester. The wet abrasion resistance in the following examples was determined by the number of cycles passed in the Taber abrasion test. The papers in the following examples were prepared on a Noble and Wood sheet machine.

EXAMPLES 1–8

A polyvinylamine hydrochloride was prepared by the method set forth by Reynolds and Kenyon in J. Am. Chem. Soc., vol. 69, page 911 (1947). The polyvinylphthalimide was prepared by polymerization of N-vinylphthalimide in water rather than in ethylene dichloride-methanol solution as recommended by Reynolds and Kenyon.

A 1% aqueous solution of the polyvinylamine hydrochloride had a specific viscosity of 25.4 cps. at 25° C. The resin hydrochloride contained 15.4% nitrogen as primary amine (Van Slyke), 15.0% total nitrogen (Kjeldahl), and 39.0% chlorine. A 1% solution of the polyvinylamine as the hydrochloride was made up.

To a bleached sulfite pulp suspension of 100 varts (solid basis) of 0.25% consistency and a Schopper-Riegler freeness of 750 cc. was added enough of the solution of the polyvinylamine hydrochloride to give a concentration of polyvinylamine as specified in Table I. The resin was added to the pulp slurry at the proportioner and the pH of the pulp adjusted to 6.0 with 10% HCl. The pulp was then formed into handsheets. The paper was dried on a regular steam-heated roll drier, the paper having a basis weight of 40 lb. per ream (24 x 36/500). The amount of resin added to the paper and the wet tensile strength and wet abrasion resistance of the paper so prepared are all set forth in Table I.

*Table I*

| Example | Polyvinylamine, Percent Added | Wet Tensile, lb./in. | Wet Abrasion, Av. No. of Cycles |
|---|---|---|---|
| 1 | 0 | 1.2 | 5 |
| 2 | 0.1 | 2.5 | 12 |
| 3 | 0.25 | 5.1 | 66 |
| 4 | 0.50 | 6.8 | 101 |
| 5 | 0.75 | 7.4 | 124 |
| 6 | 1.0 | 7.4 | 143 |
| 7 | 2.0 | 6.2 | 94 |
| 8 | 3.0 | 5.4 | 96 |

EXAMPLES 9–16

The solution of Examples 1–8 containing 1% polyvinylamine as the hydrochloride was used in these examples. Paper was prepared as in Examples 1–8 having a basis weight of 40 lb. per ream (25 x 36/500). The resin was added as in Examples 1–8. Instead of bleached sulfite for all the examples, the resin solution was added to various types of pulp as specified in Table II. All the pulps from which the paper was made were adjusted to a pH of 6 by adding 10% HCl after adding the resin solution with the exception of Examples 13 and 14 where, after addition of the resin solution, the unbleached kraft pulp had 0.25% of a commercial rosin size added and then had the pH adjusted to 6.5 by the addition of 10% alum solution. The type of pulp used, the amount of resin added and the wet tensile strength of the resulting paper are set forth in Table II.

*Table II*

| Example | Pulp | Percent Resin Added | Wet Tensile Strength, lb./in. |
|---|---|---|---|
| 9 | Bleached sulfite | 0 | 1.2 |
| 10 | ...do... | 1 | 9.2 |
| 11 | Bleached kraft | 0 | 1.3 |
| 12 | ...do... | 1 | 11.7 |
| 13 | Unbleached kraft | 0 | 3.1 |
| 14 | ...do... | 1 | 11.4 |
| 15 | {20% Bleached sulfite / 80% Groundwood} | 0 | 1.3 |
| 16 | {20% Bleached sulfite / 80% Groundwood} | 1 | 5.4 |

EXAMPLES 17–41

For these examples a 1% solution of the polyvinylamine as the hydrochloride prepared as in Examples 1–8 was made up, and the pH of the 1% solution was adjusted to 6.0 by the addition of 50% sodium hydroxide. Sheets of a basis weight of 40 lb. per ream (24 x 36/500) were made up as in Examples 1–8 using both bleached sulfite and unbleached kraft for the pulps. Instead of adding a 1% solution of the resin to the proportioner as in Examples 1–8, however, the 1% solution of the resin was added to the paper by various means as set forth in Table III. The pulps from which the papers of these examples were prepared had a pH of 7 before adding the resin solution. Table III sets forth the method of addition of the resin, the amount of resin in the paper and the wet tensile strength of the resulting paper for both a bleached sulfite pulp and an unbleached kraft pulp. In Examples 20–25 and 33–38, the sheet was saturated by dipping the sheet into the resin solution.

*Table III*

| Example | Method of Resin Addition | Bleached Sulfite Paper | |
|---|---|---|---|
| | | Resin in Sheet, percent | Wet Tensile, lb./in. |
| 17 | No resin added | 0 | 1.3 |
| 18 | ...do... | 0 | 1.4 |
| 19 | ...do... | 0 | 1.3 |
| 20 | Wet sheet saturated | 1.47 | 9.3 |
| 21 | ...do... | 1.47 | 8.7 |
| 22 | ...do... | 1.47 | 8.8 |
| 23 | Dry sheet saturated | 1.2 | 8.1 |
| 24 | ...do... | 1.1 | 7.9 |
| 25 | ...do... | 1.1 | 7.9 |
| 26 | Resin added to proportioner | 0.76 | 6.9 |
| 27 | ...do... | 0.76 | 7.0 |
| 28 | Resin added to Deckle Box | 0.76 | 8.1 |
| 29 | ...do... | 0.76 | 7.6 |

| Example | Method of Resin Addition | Unbleached Kraft Paper | |
|---|---|---|---|
| | | Resin in Sheet, percent | Wet Tensile, lb./in. |
| 30 | No resin added | 0 | 1.8 |
| 31 | ...do... | 0 | 1.7 |
| 32 | ...do... | 0 | 1.7 |
| 33 | Wet sheet saturated | 1.47 | 14.1 |
| 34 | ...do... | 1.47 | 13.6 |
| 35 | ...do... | 1.47 | 13.4 |
| 36 | Dry sheet saturated | 1.2 | 11.1 |
| 37 | ...do... | 1.0 | 10.3 |
| 38 | ...do... | 1.0 | 10.4 |
| 39 | Resin added to proportioner | 0.72 | 9.9 |
| 40 | ...do... | 0.72 | 10.9 |
| 41 | ...do... | 0.72 | 12.7 |

EXAMPLES 42–50

For Examples 42–46, a 1% solution of the polyvinylamine as the hydrochloride prepared as in Examples 1–8 was made up, and the pH adjusted to 8 by the addition of 50% sodium hydroxide. Paper sheets having a basis weight of 40 lb. per ream (24 x 36/500) were made up from bleached sulfite pulp as set forth in Examples 1–8, the resin being added as set forth in those examples. The pH of the pulps from which the papers containing the polyvinylamine and the control paper were prepared was 8 which was obtained by the addition of 50% sodium hydroxide to the pulp slurry. Part of the sheets used in the examples were cured for one hour at 105° C.

The papers of Examples 47–50 contained a commercial melamine-formaldehyde resin sold as a pulp additive for producing paper having improved wet strength. The pulp used in preparing the papers containing melamine-formaldehyde resin had a pH of 4.5 which is specified by the resin manufacturer as the optimum pH for the use of the resin. This pH was obtained by adding alum to the pulp slurry. The resin solution was prepared as follows: To 183.1 parts of water were added 9.9 parts of HCl (20° Bé.). The mixture was stirred and then 25 parts of the melamine-formaldehyde resin were added with constant stirring. The stirring was continued for 30 minutes. The solution was kept overnight at room temperature. After this aging at 12% concentration, the solution was diluted with cold water to 10% concentration. This 10% solution was added to the paper slurry according to the directions issued by the manufacturer for this resin. The amount of resin and the wet tensile strength of the resulting papers, both cured and uncured, are set forth in Table IV.

Table IV

| Example | Resin Added, Percent | Wet Tensile Strength, lb./in. | |
|---|---|---|---|
| | | Polyvinylamine–pH 8 | |
| | | Cured | Uncured |
| 42 | 0 | 1.4 | 1.1 |
| 43 | 0.5 | 5.8 | 4.8 |
| 44 | 1.0 | 7.3 | 6.2 |
| 45 | 1.5 | 7.1 | 5.8 |
| 46 | 2.0 | 7.1 | 5.9 |
| | | Melamine-Formaldehyde Resin—pH 4.5 | |
| 47 | 0.5 | 3.4 | 1.9 |
| 48 | 1.0 | 5.2 | 2.4 |
| 49 | 1.5 | 6.1 | 3.2 |
| 50 | 2.0 | 7.3 | 4.1 |

EXAMPLES 51 AND 52

A polyvinylamine hydrochloride was prepared as set forth in Examples 1–8. A 1% aqueous solution of the polyvinylamine hydrochloride had a specific viscosity of 15 cps. at 25° C. A 1% solution of the polyvinylamine as the hydrochloride was made up.

To a bleached sulfite pulp suspension of 100 parts (solids basis) of 0.25% consistency and a Schopper-Riegler freeness of 750 cc. was added enough of the 1% solution of the polyvinylamine to give a concentration of polyvinylamine as specified in Table V. The resin was added to the pulp slurry at the proportioner, and the pH of the pulp adjusted to 6.0 with 10% HCl. The pulp was then formed into handsheets. The paper was dried on a regular steam-heated roll drier, the paper having a basis weight of 40 lb. per ream (24 x 36/500). Those samples which were cured were heated at 105° C. for one hour. The amount of resin added to the paper and the wet strength of the paper so prepared are all set forth in Table V.

Table V

| Example | Resin Added, Percent | Cured | Uncured |
|---|---|---|---|
| 51 | 0.5 | 4.9 | 4.0 |
| 52 | 1.0 | 6.6 | 5.5 |

EXAMPLE 53

A polyvinylamine hydrochloride was prepared as set forth in Examples 1–8. A 1% aqueous solution of the polyvinylamine hydrochloride had a specific viscosity of 37.3 cps. at 25° C. A 1% solution of the polyvinylamine as the hydrochloride was made up.

To a bleached sulfite pulp suspension of 100 parts (solids basis) of 0.25% consistency and a Schopper-Riegler freeness of 750 cc. was added enough of the 1% solution of the polyvinylamine to give a concentration of polyvinylamine of 0.5%. The resin was added to the pulp slurry at the proportioner, and the pH of the pulp adjusted to 6.0 with 10% HCl. The pulp was then formed into handsheets. The paper was dried on a regular steam-heated roll drier, the paper having a basis weight of 40 lb. per ream (24 x 36/500). The paper had a wet tensile strength, uncured, of 5.8 lb. per inch.

EXAMPLE 54

15.6 parts of a polyvinylphthalimide prepared as set forth in Examples 1–8 were placed in a bomb with 135 parts of aqueous ammonium hydroxide containing 28% ammonia. The bomb was then heated at 100° C. for 8 hours. The reaction product so obtained was refluxed for 7 hours with 120 parts of concentrated hydrochloric acid. The polymer hydrochloride separated from the acid solution as a dark green water-soluble gum. The gum was dissolved in water and reprecipitated in acetone. Analysis of the polymer hydrochloride gave the following data: 11.2% total nitrogen (Kjeldahl), 8.14% primary amino nitrogen (Van Slyke), and 20.8% chlorine. A 1% solution of the polyvinylamine as the hydrochloride was made up.

To a bleached sulfite pulp suspension of 100 parts (solids basis) of 0.25% consistency and a Schopper-Riegler freeness of 750 cc. was added enough of the solution of the polyvinylamine hydrochloride to give a concentration of polyvinylamine of 1%. The resin was added to the pulp slurry at the proportioner, and the pH of the pulp adjusted to 6.0 with 10% HCl. The pulp was then formed into handsheets according to conventional techniques. The paper was dried on a regular steam-heated roll drier, the paper having a basis weight of 40 lb. per ream (24 x 36/500). Control sheets of paper were prepared from the same stock using exactly the same procedure with the exception that no resin was added to the paper at any time. The control sheets containing no resin had a wet tensile strength of 0.24 lb. per inch, whereas the similar sheets of paper containing 1% of the polyvinylamine as prepared above had a wet tensile strength of 3.7 lb. per inch.

Polyvinylamine may be used to obtain increased wet strength in the paper over a pH range of 5–10 with a pH of 6–8 being preferred. A significant increase in the wet strength of paper is obtained when a polyvinylamine is used which has a specific viscosity as low as about 2 cps. (in 1% by weight aqueous solution of the polyvinylamine hydrochloride measured at 25° C.). It is preferred, however, that the polyvinylamine have as high a specific viscosity as possible. Polyvinylamine may be added at any stage of the papermaking process, but it is preferred to add the resin to the formed web. Even as little as 1/10 of 1% of the resin more than doubles the wet tensile strength of the paper. For purposes of economy it is preferred not to use more than 15% by weight of the resin. It is most preferred to use from about 0.5% to about 2% by weight of the resin. It is understood, of course, that in the case of the impure polyvinylamines slightly higher concentrations of resin must be used than in the case of pure polyvinylamine to obtain an equivalent increase in wet strength.

The use of polyvinylamine as a wet-strength resin eliminates the necessity for using low pH's in pulp slurries, does away with the necessity of curing the resulting paper or board, and results in a paper or board of greatly increased wet strength compared with cellulosic products prepared with prior art resins at amounts of resin as little as 1%.

What I claim and desire to protect by Letters Patent is:

1. A high wet-strength felted cellulosic product comprising cellulosic fibers having incorporated therewith up to about 15% based on the weight of the fibers of a polyvinylamine selected from the group consisting of polyvinylamine and polymeric solvolytic products of N-vinylimides of organic dicarboxylic acids, said polymeric solvolytic products having at least 60% of their nitrogen present as primary amino groups.

2. A high wet-strength paper comprising cellulosic paper fibers having incorporated therewith up to about 15% based on the weight of the fibers of a polyvinylamine selected from the group consisting of polyvinylamine and polymeric solvolytic products of N-vinylimides of organic dicarboxylic acids, said polymeric solvolytic products having at least 60% of their nitrogen present as primary amino groups.

3. A high wet-strength paper comprising cellulosic paper fibers having incorporated therewith from about 0.5% to about 2% based on the weight of the fibers of polyvinylamine.

4. In a process for preparing a high wet-strength paper, the improvement which comprises incorporating with the paper fibers, at a pH of from about 5 to about 10, up to about 15%, based on the weight of the fibers, of a polyvinylamine selected from the group consisting of polyvinylamine and polymeric solvolytic products of N-vinylimides of organic dicarboxylic acids, said polymeric solvolytic products having at least 60% of their nitrogen present as primary amino groups.

5. In a process for preparing a high wet-strength paper, the improvement which comprises incorporating with the paper fibers, at a pH of from about 5 to about 10, up to about 15%, based on the weight of the fibers, of polyvinylamine.

6. In a process for preparing a high wet-strength paper, the improvement which comprises incorporating with the paper fibers, at a pH of from about 5 to about 10, from about 0.5% to about 2%, based on the weight of the fibers, of polyvinylamine.

References Cited in the file of this patent

UNITED STATES PATENTS

| | | |
|---|---|---|
| 1,160,365 | Baekeland | Nov. 16, 1915 |
| 2,394,289 | Boughton | Feb. 5, 1946 |
| 2,484,423 | Reynolds et al. | Oct. 11, 1949 |
| 2,526,125 | Francis | Oct. 17, 1950 |
| 2,566,237 | McQueen et al. | Aug. 28, 1951 |
| 2,605,253 | Auten et al. | July 29, 1952 |
| 2,631,097 | Redfern | Mar. 10, 1953 |